UNITED STATES PATENT OFFICE.

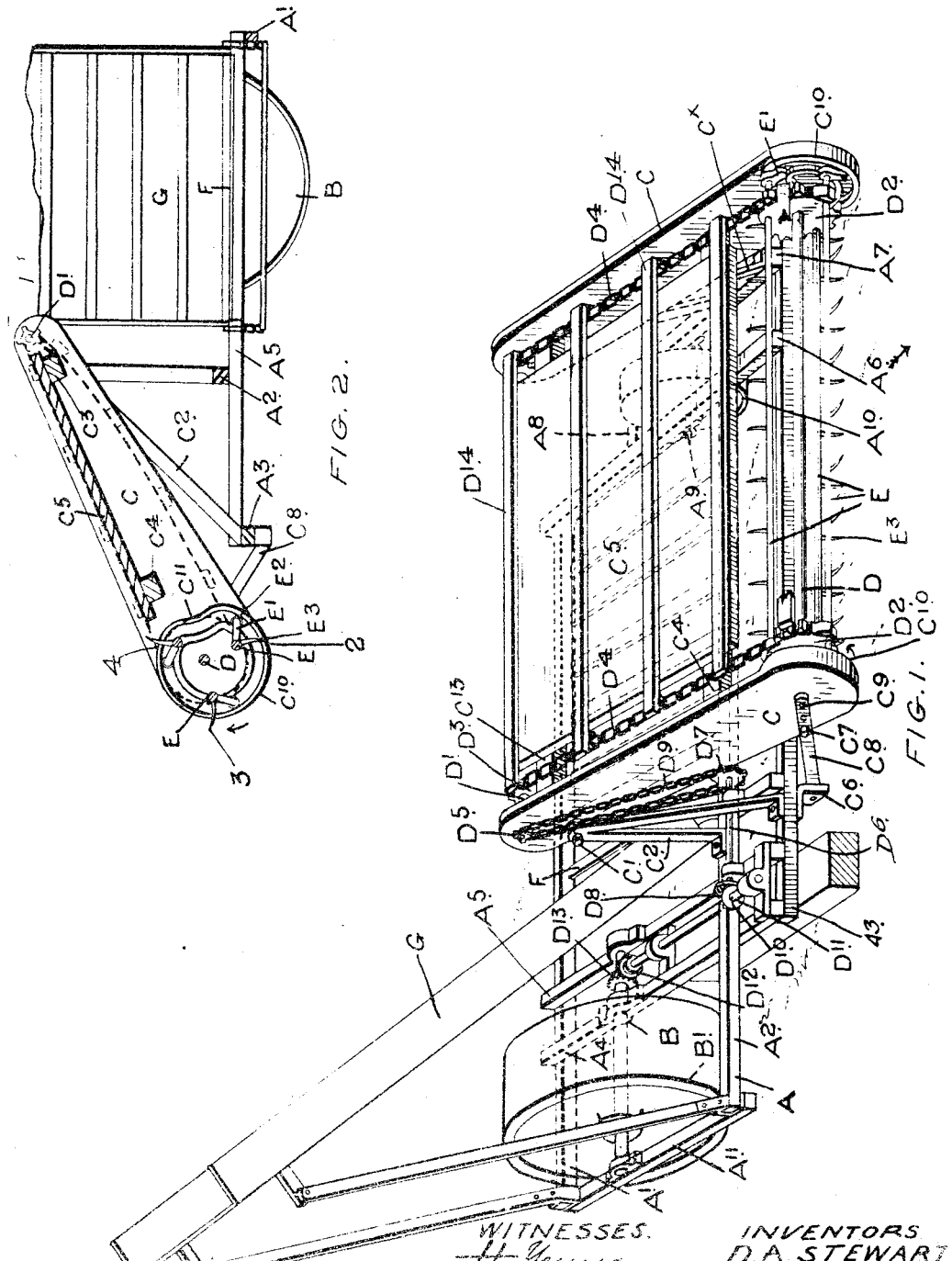

DAVID ALBERT STEWART, ROBERT CHARLES STEWART, AND JOHN FERGUSON STEWART, OF MOLESWORTH, ONTARIO, CANADA.

SHOCK, SHEAF, OR HAY LOADER.

1,051,775.  Specification of Letters Patent.  Patented Jan. 28, 1913.

Application filed April 5, 1909. Serial No. 487,951.

*To all whom it may concern:*

Be it known that we, DAVID ALBERT STEWART, ROBERT CHARLES STEWART, and JOHN FERGUSON STEWART, all of the town of Molesworth, in the county of Huron, in the Province of Ontario, Canada, have invented certain new and useful Improvements in Shock, Sheaf, or Hay Loaders, of which the following is the specification.

Our invention relates to improvements in shock, sheaf, or hay loaders and the object of the invention is to devise a form of carrier which will be simple, cheaply made, easily driven, take up a minimum amount of power, which will effectually lift or raise the shock or sheaf of hay from the surface of the field expeditiously, and it consists essentially of a main frame supported on the main driving wheel and follow wheel, an elevating mechanism comprising inclined side boards connected together by suitable intervening cross bars, cam-ways formed to the inside face of the side boards at the lower ends thereof the cam-way being of an irregular circular form, a supporting table supported on the intervening cross bars, upper and lower shafts journaled respectively in the upper and lower ends of the inclined side boards, suitable driving means connecting one of the shafts with the main driving wheel, sprocket gears journaled in proximity to each end of the lowermost shaft, rocking bars extending through and journaled in the sprocket gears such rocking bars being provided with suitable prongs and end crank arms having rollers designed to extend into the aforesaid cam-ways to co-act therewith, sprocket pinions mounted on the upper shaft, sprocket chains connecting the sprocket gears with the sprocket pinions and cross bars connected to the sprocket chains so as to form a slat conveyer and designed to pass over the supporting table as hereinafter more particularly described by the following specification.

Figure 1, is a general perspective view of our device. Fig. 2, is a cross sectional view taken centrally through the elevating conveyer, the frame of the machine and the cross conveyer over which the elevating conveyer extends.

In the drawings like letters of reference indicate corresponding parts in each figure.

A is the main frame of the machine comprised by the longitudinal bars $A'$ $A^2$ and $A^3$ and the cross bars $A^4$ $A^5$ $A^6$ and $A^{11}$. The main frame is also provided with a supplemental bar $A^7$ L-shaped in form and connected at its forward end to the longitudinal bar $A^3$ from which it extends rearwardly in a parallel direction to the cross bar $A^5$. At the rear of the cross bar $A^7$ is provided a right angular extension $A^8$ which is connected to the cross bar $A^6$ intermediately of its length. Beneath the bars $A^6$ and $A^7$ are secured journal brackets in which is mounted a suitable shaft $A^9$ carrying the follow wheel $A^{10}$. Between the cross bars $A^{11}$ $A^4$ and $A^5$ is journaled the driving shaft B on which is mounted the main driving wheel $B'$ shown by dotted lines in the drawing.

C C are the side boards of our elevating conveyer provided in proximity to their upper ends with a stud $C'$. The stud $C'$ of the board extends through a supporting standard $C^2$ secured at its lower end to the longitudinal bars $A^2$ and $A^3$. The opposing side boards C are similarly supported by a standard $C^4$ secured at its lower end upon the bar $A^7$.

$C^3$ and $C^4$ are intervening cross bars which connect the side boards together in proximity to their upper and lower ends respectively.

$C^5$ is a supporting table secured to the cross bars $C^3$ and $C^4$.

$C^6$ are brackets (one only of which is shown) secured beneath the longitudinal bar $A^2$ and $C^7$ are studs extending from each of the side boards C.

$C^8$ are bars pivotally connected at their lower ends to the brackets $C^6$ and provided at their upper ends with a series of holes $C^9$. By this means the lowermost end of the side boards forming the elevating conveyer may be adjusted to any desired height in relation to the ground. The tongue (not shown) supports the forward portion of the machine.

D is a lower shaft journaled in the side boards in proximity to the bottom thereof and $D'$ is a cross shaft journaled in the side boards C in proximity to the upper end thereof.

$D^2$ are sprocket wheels secured to the shaft D in proximity to each end thereof.

$C^{10}$ are cam-ways formed in the side boards C at the lower ends thereof. The form of such cam-ways are particularly shown in Fig. 2 of the drawings. The major portion of such cam-way is formed circular and eccentric to the center of the shaft D. The rear portion of the way is provided with irregular depressed portions $C^{11}$.

E are a series of rocking bars preferably three in number and journaled in proximity to each end in the sprocket wheels $D^2$. The ends of the rocking shafts are provided with crank portions $E'$.

$E^2$ are rollers suitably journaled at the ends of the crank portions $E'$ to the outside thereof. The rollers $E^2$ extend into the cam-ways $C^{10}$ and co-acting therewith give the required rocking motion to the rocking shafts E.

The rocking bars E are provided with a series of prongs $E^3$ designed to grip the shock so as to lift the same from the ground.

The upper shaft $D'$ is provided with sprocket pinions $D^3$.

$D^4$ are sprocket chains connecting the sprocket gears $D^2$ with the sprocket pinions $D^3$.

$D^{14}$ are cross bars or slats secured at each end to the chains $D^4$ and spaced suitable distances apart. The slats $D^{14}$ as they are carried upwardly pass over the upper surface of the table $C^5$ and are supported thereby during such upward movement.

The end of the shaft $D'$ which is nearest the main drive wheel $B'$ is provided with a sprocket pinion $D^5$.

$D^6$ is an arbor journaled in suitable bearings forming part of the main frame of the machine and provided at one end with a sprocket gear $D^7$ and at its opposite end with a bevel gear $D^8$.

$D^9$ is a sprocket chain connecting the sprocket chain $D^7$ with a sprocket pinion $D^5$.

$D^{10}$ is a counter shaft provided in proximity to one end with a bevel gear $D^{11}$ which meshes with the bevel gear $D^8$. $D^{12}$ is a bevel gear mounted on the opposite end of the counter shaft $D^{10}$ and $D^{13}$ is a bevel gear mounted on the main driving shaft B such gear $D^{13}$ meshing with the gear $D^{12}$.

F is a cross conveyer of any suitable construction which is mounted on the main frame to the rear of the main elevator conveyer and is designed to receive the shocks as they are elevated so as to carry such shock laterally to the main elevator G designed to convey the shock on to the top of the load. The conveyers F and G may be of any desired constructions and we do not lay any claim on such construction but merely show them to show how our elevator conveyer operates in conjunction therewith.

Having described the principal parts involved in our invention we will briefly describe the operation of the same. Our machine is drawn over the surface of the field in the direction indicated by arrow in Fig. 1. The lowermost end of our elevator is adjusted by means of the bar $C^8$ so as to be in close proximity to the ground and as the machine passes forwardly the sprocket wheels $D^2$ are driven in the direction indicated by arrow. By means of the sprocket chains $D^4$ the pinions $D^3$ and $D^5$, the sprocket gear $D^7$ and the bevel gearing above described connect such sprocket gearing with the main driving shaft B. By the rotation of the sprocket wheel $D^2$ the rocking shafts E are carried around in a circular direction and the prongs extending from the same assume the various positions shown in Fig. 2 of the drawings by means of the rollers $E^2$ co-acting with the cam-way $C^{11}$. As the prongs pass from the point 2 to the point 3 they gradually change from a substantially vertical position to a substantially horizontal position so as to enter the sheaf and elevate it until the prongs reach the point 4. The prongs then pass downwardly in a vertical position so as to allow of the shock being stripped from the prongs and to be thrown by the impetus of the revolving mechanism onto the table $C^5$ over which it is carried by the cross slats $D^{14}$. The slats $D^{14}$ carry the shock or sheaf over the table $C^5$ and throw them over the upper end thereof onto the cross conveyer F by which they are carried in the usual manner to the main elevator G which elevates them onto the top of the load.

In a device such as we have described the sheaves or shocks are elevated onto the load by a minimum amount of power which machine is at the same time simple in construction and cheap to manufacture.

What we claim as our invention is:

1. A hay loader comprising a supporting frame, supporting wheels for the frame, vertical standards on said frame, a conveyer comprising side boards each having their upper ends pivotally supported to the upper ends of said standards, and having their lower ends secured to a bracket extending from the main frame, by means of a pin through one of a series of holes in said bracket, so as to vary the position of said conveyer, shafts supported at each end of the conveyer, sprocket wheels on said shafts, sprocket chains passing over said wheels, conveying means carried by said chains, and means for driving the upper shaft from the supporting wheels.

2. A hay loader comprising a supporting frame, supporting wheels therefor, vertical standards supported on said frame, a conveyer consisting of side boards each having one end pivotally supported on the standards, and having their lower ends secured to a bracket extending from the main frame, by means of a pin through one of a series of holes in said bracket, so as to vary the position of said conveyer, an upper and a lower shaft for the conveyer, sprocket wheels on said shafts, chains passing over said wheels, conveying means on said chains, a table over which the upper portion of the conveying means passes, a reel located at the lower end of the conveyer, prongs thereon, one end of the upper shaft passing through one of the side boards, a sprocket wheel on said extended end, a countershaft on the frame having a sprocket wheel thereon, a sprocket chain extending from said wheel to the wheel on the extended end of the shaft, and means connecting the countershaft with one of the supporting wheels.

3. A hay loader comprising a supporting frame, supporting wheels therefor, standards on the frame, a conveyer having its upper end pivoted to said standards and bars each having one end pivoted to the frame and having their lower ends secured to a bracket extending from the main frame, by means of a pin through one of a series of holes in said bracket, so as to vary the position of said conveyer, whereby the lower end of the conveyer may be adjusted in relation to the frame and means for actuating the conveyer from the supporting wheels.

DAVID ALBERT STEWART.
ROBERT CHARLES STEWART.
JOHN FERGUSON STEWART.

Witnesses:
MARGARET MacKENZIE,
H. B. MORPHY.